No. 724,424. PATENTED APR. 7, 1903.
S. N. BETTS.
SUPERVISOR'S ASSISTANT.
APPLICATION FILED JULY 18, 1902.

NO MODEL. 2 SHEETS—SHEET 1.

Witnesses: Inventor
C. F. Shurt Stephen N Betts

No. 724,424. PATENTED APR. 7, 1903.
S. N. BETTS.
SUPERVISOR'S ASSISTANT.
APPLICATION FILED JULY 18, 1902.
NO MODEL. 2 SHEETS—SHEET 2.

Witnesses: Inventor:

UNITED STATES PATENT OFFICE.

STEPHEN N. BETTS, OF HILLSDALE, MICHIGAN.

SUPERVISOR'S ASSISTANT.

SPECIFICATION forming part of Letters Patent No. 724,424, dated April 7, 1903.

Application filed July 18, 1902. Serial No. 116,127. (No model.)

*To all whom it may concern:*

Be it known that I, STEPHEN N. BETTS, of the city of Hillsdale, county of Hillsdale, and State of Michigan, have invented a new and useful device which I call the "Supervisor's Assistant," of which the following is a specification.

Figure 1:
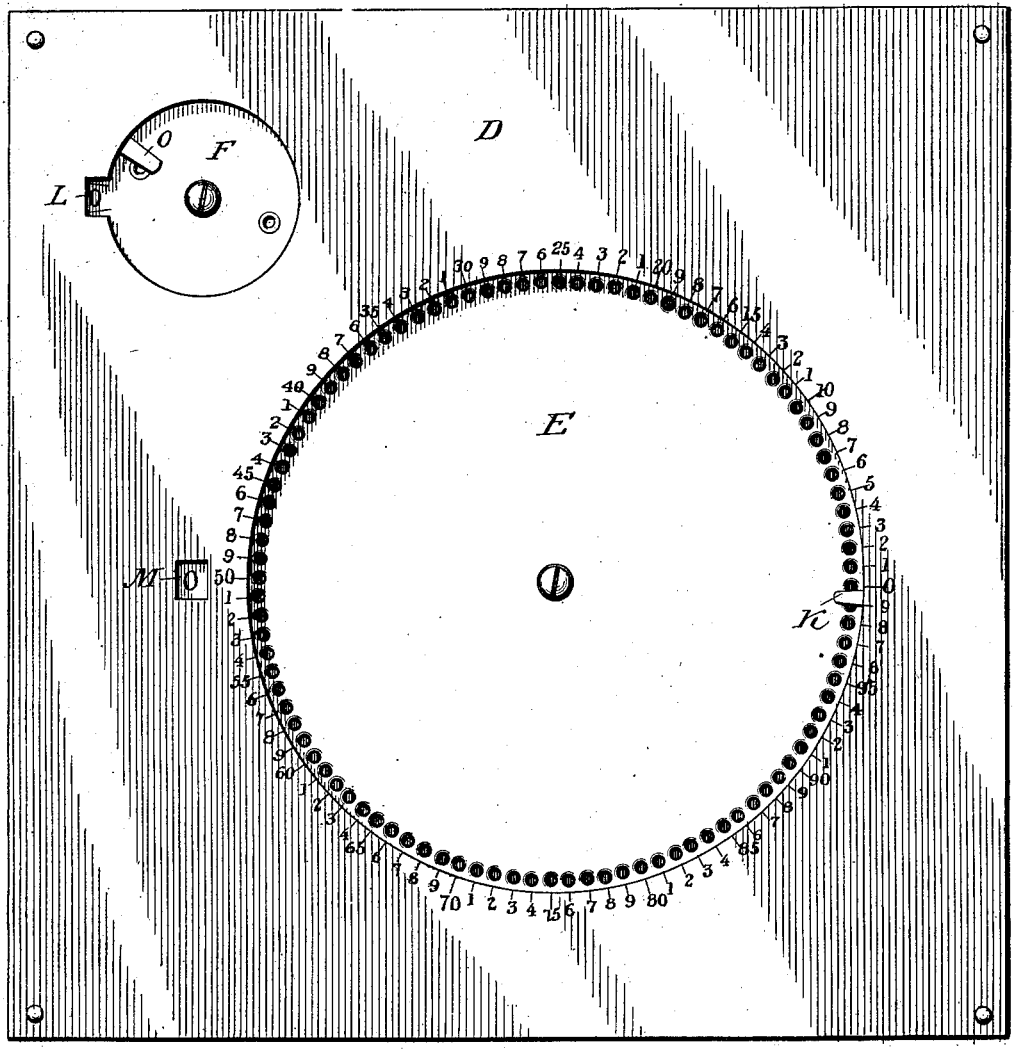
Figure 2:
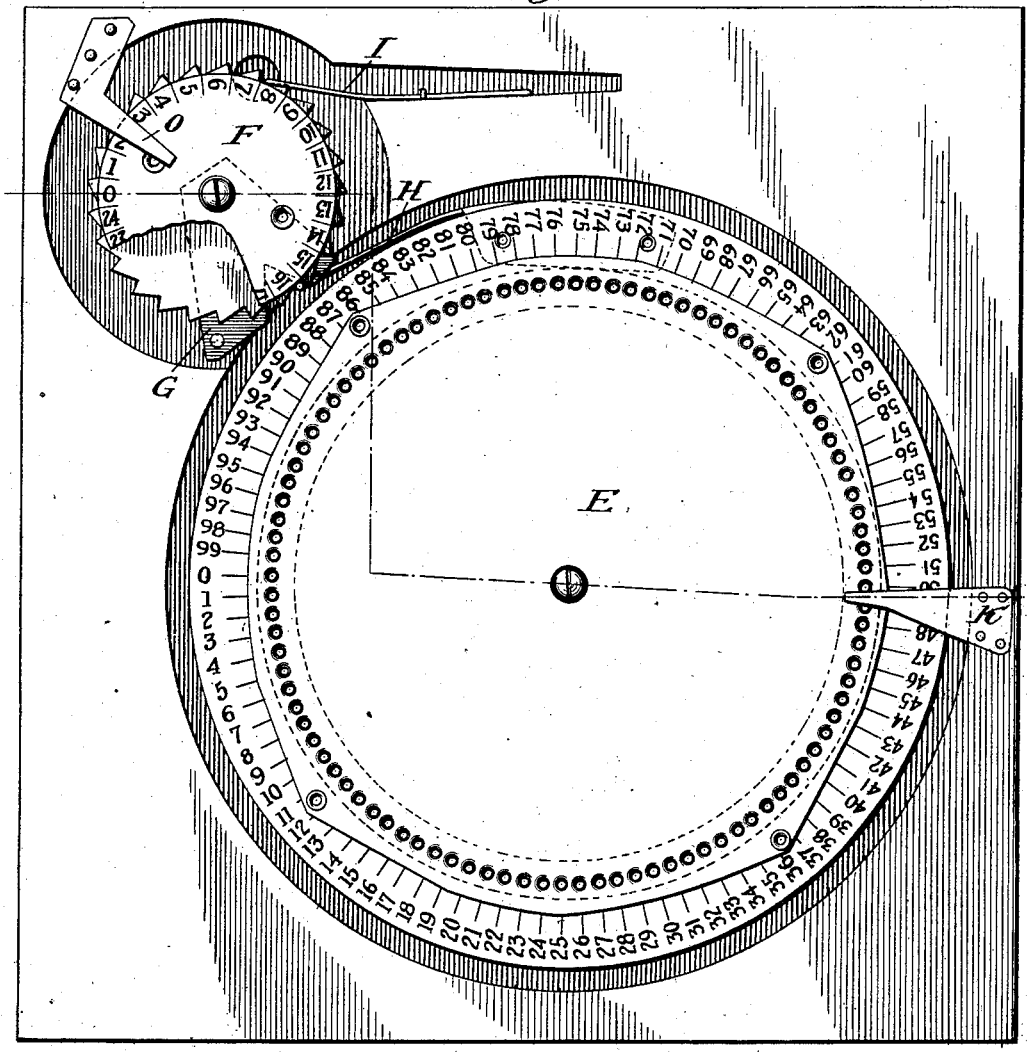
Figure 3:
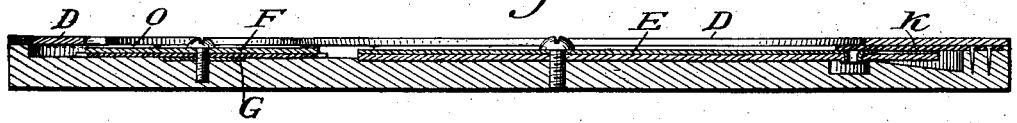
Figure 4:

Figure 1 is a plan view of the adding-machine. Fig. 2 is a view with the face-plate removed. Fig. 3 is an end view, and Fig. 4 is a view of the implement for operating the adding-machine.

Near the center of the plate D is a large orifice, around which are arranged at uniform distances the figures from "1" to "100," inclusive, and under this large orifice is located the large wheel E. At the upper left-hand corner of plate D is a small orifice under which is located the small wheel F. At the left of the large orifice in plate D is the slot M, and at the left of the small orifice in plate D is the notch L. On the outer rim of the large wheel E are arranged at uniform distances the numbers from "1" to "100," and opposite to each number is a hole. On the outer rim of the large wheel E is a spring H. The small wheel F has cogs or ratchets on its outer rim, and each cog is numbered on the face of the wheel. The guard-plate G is metallic and is located under the small wheel F. It has a notch P in the edge facing the large wheel E, so that the spring H will catch and move forward the small wheel F one cog at each revolution of the large wheel E. The spring I is simply a brake to prevent the small wheel F from going forward more than one cog at a time.

Operation: Always turn the wheels E and F forward and never backward, and never try to move the small wheel F when O is in the slot M. To set the adder for work, first put "24" on the small wheel F in the notch L; second, turn the large wheel E forward until O comes into the slot M. Now O is also in the notch L, and the adder is ready for work. We add two columns at once. Suppose the first number to be added is "32." You put the awl in the hole in the wheel E opposite "32" on the plate D and move it forward until it is stopped by the stop K. "32" will now be seen in slot M. Now put your awl in the hole opposite the next number to be added (we will suppose it to be "82") and turn forward until stopped by the stop K, and you will have "1" in the notch L and "14" in the slot M, which will be one hundred and fourteen. Now put your awl in the hole opposite "95," the next number to be added, and move forward until stopped by K, and you have "2" in the notch L and "9" in slot M, which make two hundred and nine, and so continue until all the columns are added. The "0" is to be supplied when only one figure appears in slot M and there are figures in the notch L. The figures in slot M are to be put under the columns added, and the figures in notch L are to be carried into the next column to be added. Now set the adder as at first by having O appear at M and L. Add the number to be carried, and then add the next columns, and so continue until all the columns are added, setting down the whole amount at the last.

What I claim as my invention, and desire to secure by Letters Patent, is—

The combination of the disk or wheel E carrying the spring H with the notched wheel F and the guard-plate G having the notch therein substantially as described.

In testimony whereof I have signed my name to this specification in the presence of two subscribing witnesses.

STEPHEN N. BETTS.

Witnesses:
SPENSER D. BISHOPP,
HENRY M. GIER.